(12) United States Patent
Shashoua et al.

(10) Patent No.: US 11,118,445 B2
(45) Date of Patent: Sep. 14, 2021

(54) SELECTIVELY SKIPPING TRANSCEIVERS TO ENHANCE COMMUNICATION QUALITY AND SPEED

(71) Applicant: Halliburton Energy Services, Inc., Houston, TX (US)

(72) Inventors: Zeke Shashoua, Dallas, TX (US); Dalmo Massaru Wakabayashi, Frisco, TX (US); Gregory Thomas Werkheiser, Dallas, TX (US); Kevin Fink, Frisco, TX (US); Cary Gorten Mondon, Farmers Branch, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 265 days.

(21) Appl. No.: 15/573,720

(22) PCT Filed: Jul. 13, 2015

(86) PCT No.: PCT/US2015/040117
§ 371 (c)(1),
(2) Date: Nov. 13, 2017

(87) PCT Pub. No.: WO2017/010980
PCT Pub. Date: Jan. 19, 2017

(65) Prior Publication Data
US 2018/0139678 A1 May 17, 2018

(51) Int. Cl.
*E21B 47/12* (2012.01)
*H04W 40/02* (2009.01)
(Continued)

(52) U.S. Cl.
CPC .............. *E21B 47/12* (2013.01); *E21B 47/14* (2013.01); *H04W 40/02* (2013.01); *H04W 40/08* (2013.01); *H04W 40/12* (2013.01)

(58) Field of Classification Search
CPC ........ E21B 47/12; E21B 47/122; E21B 47/14; H04W 40/12; H04W 40/02; H04W 40/08
See application file for complete search history.

(56) References Cited

U.S. PATENT DOCUMENTS

| | | | | | |
|---|---|---|---|---|---|
| 4,912,461 | A | * | 3/1990 | Cenzano, Jr. | ........ H04B 5/0056 340/12.13 |
| 6,816,082 | B1 | * | 11/2004 | Laborde | .................. E21B 47/12 340/853.3 |

(Continued)

FOREIGN PATENT DOCUMENTS

WO 2007020475 A1 2/2007
WO 2017010980 A1 1/2017

*Primary Examiner* — Ian J Lobo
(74) *Attorney, Agent, or Firm* — John W. Wustenberg; Parker Justiss, P.C.

(57) ABSTRACT

A system for improving communication between surface and downhole equipment, in some embodiments, comprises: a first transceiver in a formation; a second transceiver in the formation; and a third transceiver in the formation, the second transceiver positioned between the first and third transceivers, wherein, upon determining that a communication quality metric pertaining to wireless communication in the formation fails to meet a criterion, the first transceiver transmits data to the second transceiver, wherein, upon determining that said communication quality metric meets the criterion, the first transceiver transmits said data to the third transceiver in lieu of transmitting said data to the second transceiver.

17 Claims, 6 Drawing Sheets

(51) Int. Cl.
*E21B 47/14* (2006.01)
*H04W 40/08* (2009.01)
*H04W 40/12* (2009.01)

(56) References Cited

U.S. PATENT DOCUMENTS

| | | | |
|---|---|---|---|
| 2006/0124297 A1 | 6/2006 | Ohmer | |
| 2008/0253228 A1* | 10/2008 | Camwell | E21B 47/12 367/82 |
| 2008/0310298 A1* | 12/2008 | Drange | H04B 1/745 370/217 |
| 2010/0124219 A1* | 5/2010 | Brand | H04W 40/08 370/389 |
| 2010/0128703 A1* | 5/2010 | Brand | H04L 45/121 370/338 |
| 2011/0140909 A1 | 6/2011 | Olson et al. | |
| 2012/0113896 A1* | 5/2012 | Karol | H04W 40/08 370/328 |
| 2012/0249338 A1 | 10/2012 | Merino | |
| 2014/0146716 A1 | 5/2014 | Chen et al. | |
| 2016/0337732 A1* | 11/2016 | Al-Walaie | H04B 10/032 |
| 2017/0342826 A1* | 11/2017 | Wilson | G01V 11/002 |

* cited by examiner

SELECTIVELY SKIPPING TRANSCEIVERS TO ENHANCE COMMUNICATION QUALITY AND SPEED

CROSS-REFERENCE TO RELATED APPLICATION

This application is the National Stage of, and therefore claims the benefit of, International Application No. PCT/US2015/040117 filed on Jul. 13, 2015, entitled "SELECTIVELY SKIPPING TRANSCEIVERS TO ENHANCE COMMUNICATION QUALITY AND SPEED," which was published in English under International Publication Number WO 2017/010980 on Jan. 19, 2017. The above application is commonly assigned with this National Stage application and is incorporated herein by reference in its entirety.

BACKGROUND

Surface equipment (e.g., computers) and downhole equipment (e.g., instruments to measure formation properties) can communicate using a variety of telemetry methods. One of these methods, acoustic telemetry, involves the communication of acoustic signals among a series of transceivers arranged between the surface equipment and the downhole equipment. Although acoustic telemetry is generally reliable and useful, numerous external factors may degrade the quality of communication between transceivers. Techniques that improve communication quality in these circumstances are desirable. In addition, techniques that take advantage of improvements in communication quality also are desirable.

BRIEF DESCRIPTION OF THE DRAWINGS

Accordingly, there are disclosed in the drawings and in the following description techniques for selectively skipping transceivers to enhance communication quality and speed.

In the drawings.

Figure 1:
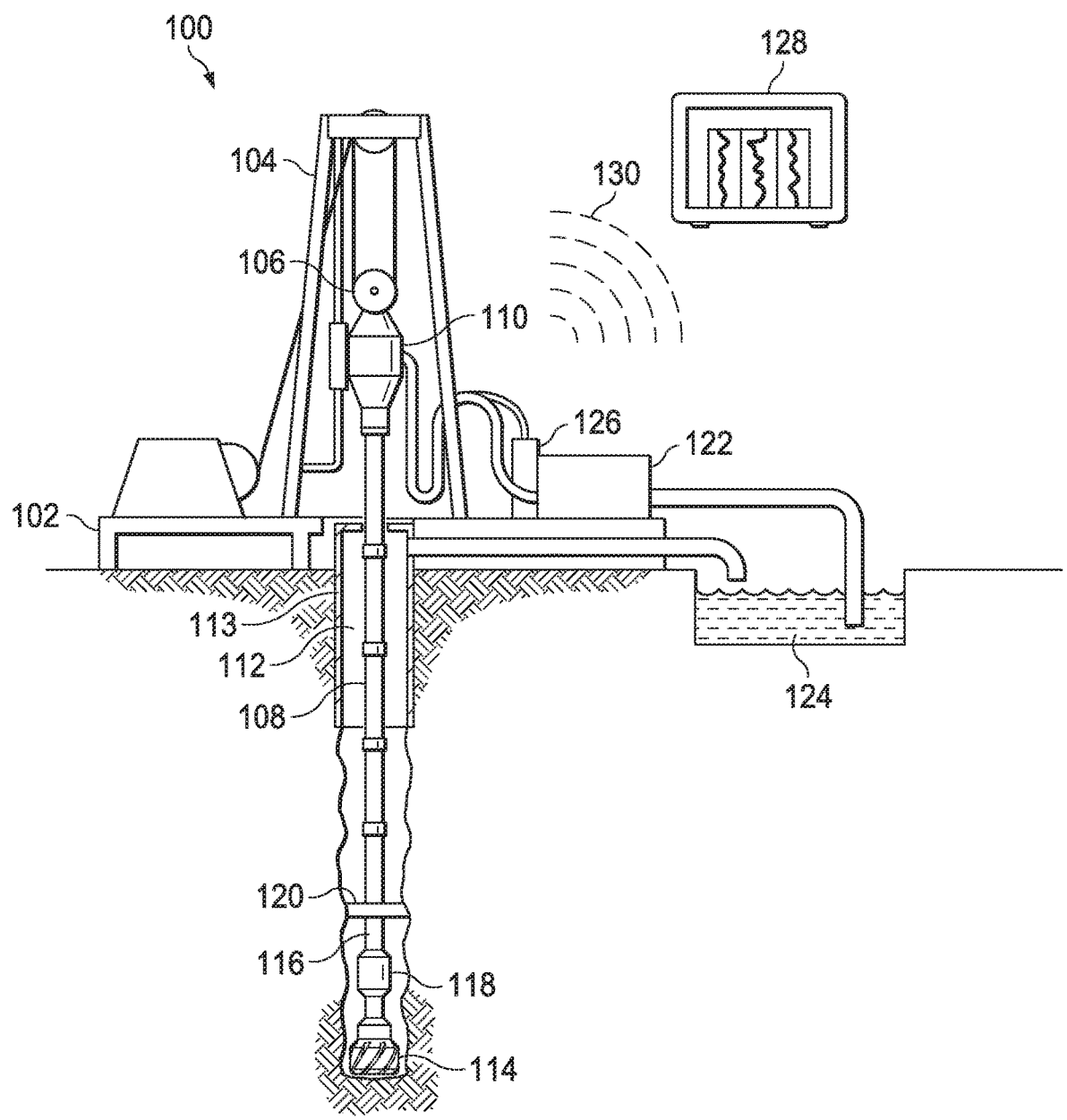
FIG. 1 is a schematic diagram of a drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are various techniques for selectively skipping transceivers when transmitting data to enhance communication quality and speed. The techniques find primary application in downhole environments, including drilling, wireline and production environments, but applications in other types of environments (e.g., surface, subsea) are contemplated and included within the scope of this disclosure. At least some of the techniques include providing a series of transceivers and transmitting data between the transceivers. In such techniques, each transceiver monitors the quality of communication that it has with neighboring transceivers and, when a metric indicative of the communication quality meets a criterion, one or more of the transceivers skips at least one other transceiver when transmitting data. For instance, if hypothetical transceivers A, B and C are serially arranged along a wellbore tubing, transceiver A might determine that the communication quality metric it has been monitoring meets a criterion, meaning that the communication quality in the general vicinity of the transceivers enables acoustic signals to travel farther than usual. As a result, transceiver A may determine that it can successfully skip transceiver B and transmit data directly to transceiver C, thus increasing data transmission speed. When this process is repeated over a large chain of transceivers, substantial gains in data transmission speed are achieved. Any number of consecutive transceivers may be skipped at a time, depending on communication quality in the location where the transceivers are positioned.

Alternative techniques include providing a series of transceivers and transmitting data between the transceivers. A given transceiver in the series may transmit data such that the next transceiver in the series is able to receive the data and so that the next transceiver after that also is able to receive the same data. If the third transceiver in this illustrative series of transceivers receives the data from the first transceiver but does not receive the data from the second transceiver within a predetermined amount of time, the third transceiver uses the data it received from the first transceiver and processes it either for analysis or for further transmission. For example, if hypothetical transceivers A, B and C are serially arranged along a wellbore tubing, transceiver A might transmit data such that transceivers B and C both receive the data. Transceiver C may wait a predetermined amount of time (e.g., 30 seconds) to receive the data from transceiver B, but, if the data from transceiver B does not arrive within that time period, the transceiver C uses the data received from transceiver A in lieu of the data that was supposed to arrive from transceiver B. These techniques improve communication quality by mitigating data losses and by identifying transceivers that may be functioning either sub-optimally or not at all.

Figure 2:
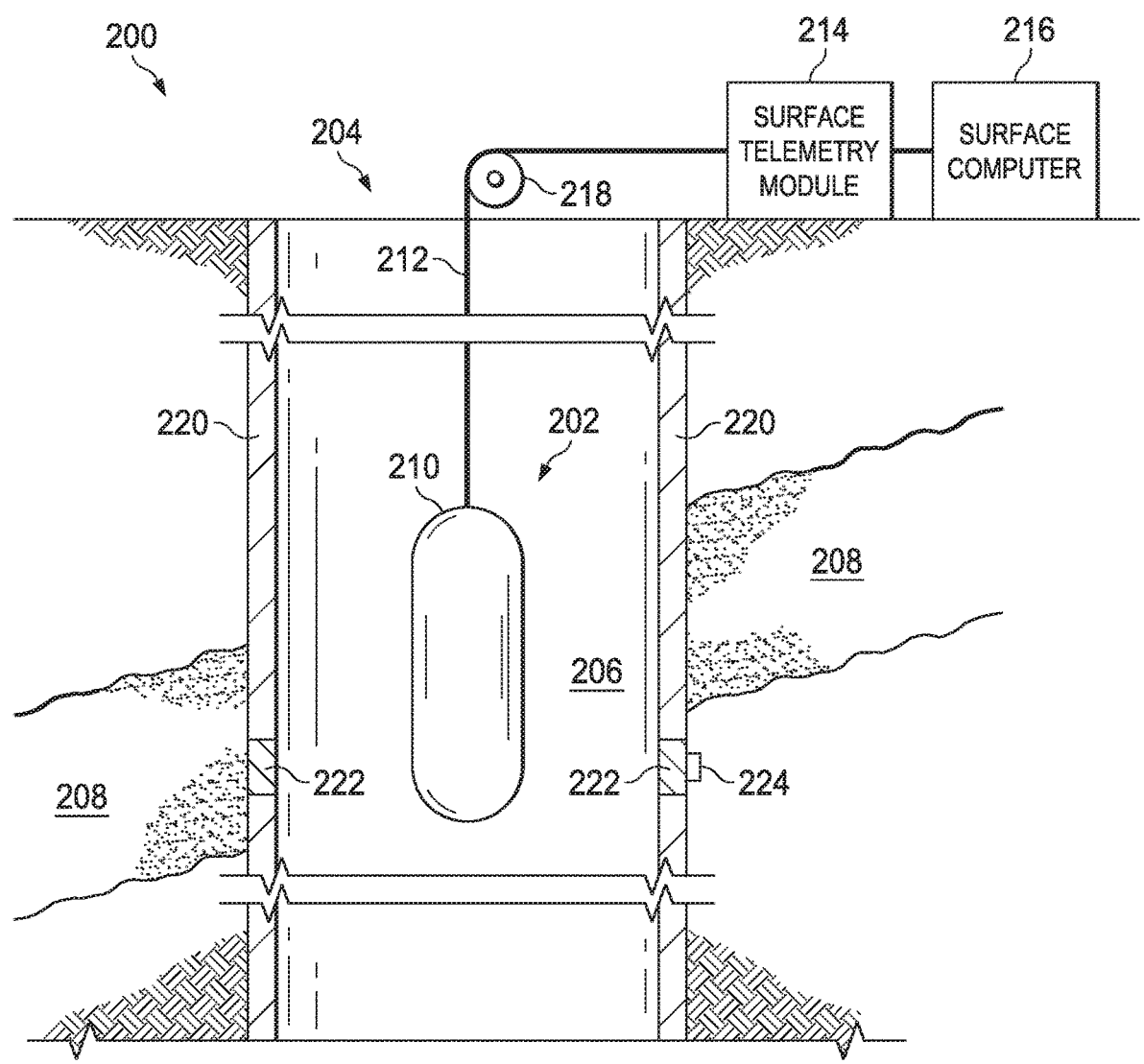
FIG. 2 is a schematic diagram of a wireline environment.
Figure 3:
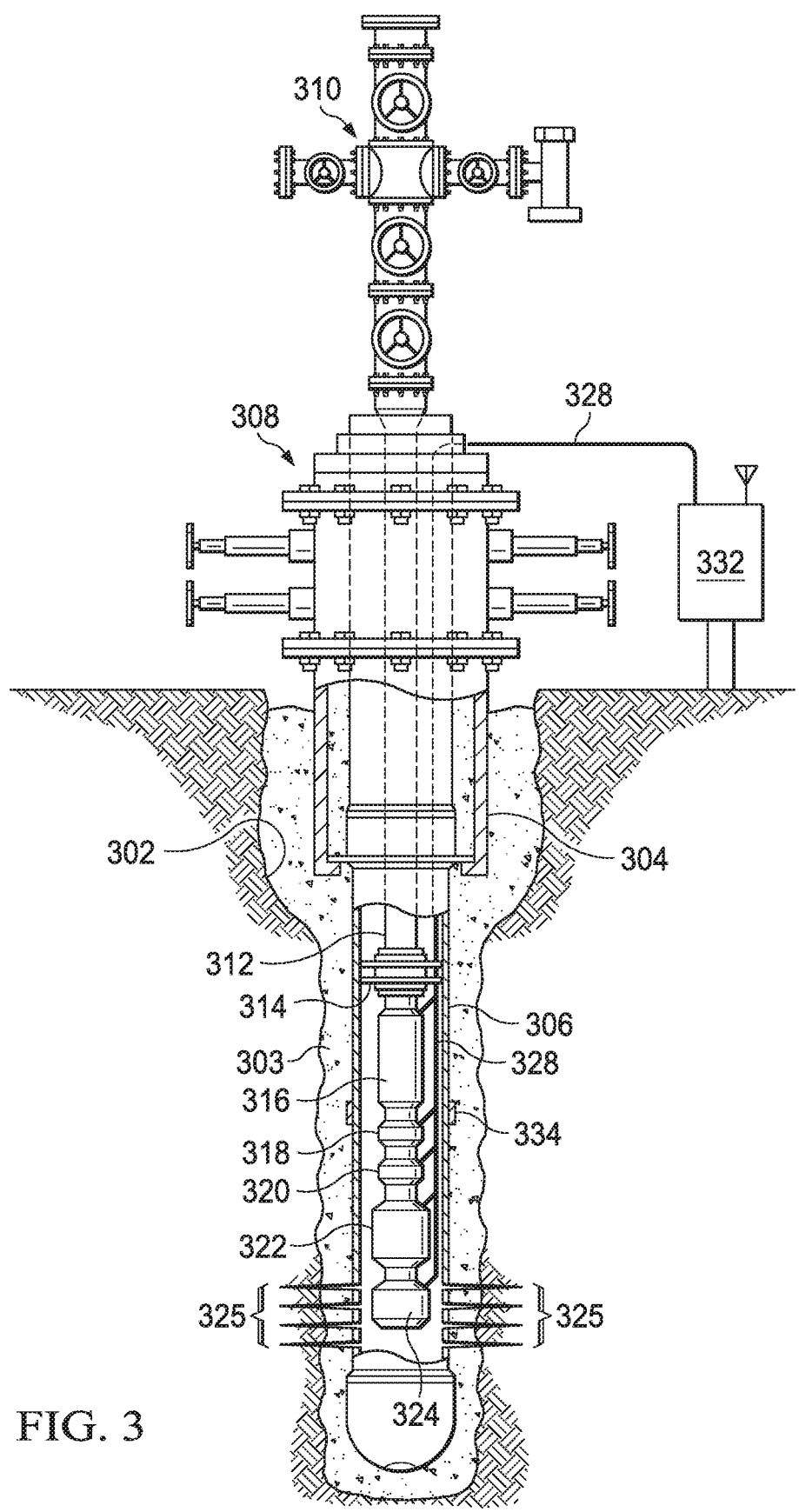
FIG. 3 is a schematic diagram of a production environment.

FIGS. 1-3 represent various environments within which the disclosed transceiver skipping techniques may be implemented. The disclosed techniques are not limited to implementation in the particular examples shown in FIGS. 1-3, however, and the scope of disclosure encompasses any and all environments in which the techniques may find beneficial application. For example, one or more of the disclosed techniques may find application in drill stem testing (DST) environments, and all such applications are encompassed within the scope of this disclosure. Further, the techniques are described herein primarily in the context of acoustic signals, but the techniques may be used in other, non-acoustic applications as well.

FIG. 1 is a schematic diagram of an illustrative drilling environment. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottom hole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings—from the borehole 112 into the retention pit 124 and aids in maintaining the integrity of the borehole. Formation samples may be extracted from the drilling fluid at any suitable time and location, such as from the retention pit 124. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased).

The drill collars in the BHA 116 are typically thick-walled steel pipe sections that provide weight and rigidity for the drilling process. The thick walls are also convenient sites for installing transmitters, receivers and logging instruments that measure downhole conditions, various drilling parameters, and characteristics of the formations penetrated by the borehole. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors in accordance with commands received from the surface, and it provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable, such as electromagnetic and acoustic telemetry. At least some of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1 as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation. The data processing unit may also contain storage to store, e.g., data received from tools in the BHA 116 via electromagnetic or acoustic telemetry or any other suitable communication technique. The scope of disclosure is not limited to these particular examples of data processing units.

FIG. 2 is a schematic diagram of an illustrative wireline environment. More specifically, FIG. 2 illustrates a logging system 200 in accordance with at least some embodiments.

Logging system 200 comprises a wireline logging tool 202 disposed within a borehole 204 proximate to a formation 208 of interest. The borehole 204 contains a casing string 220 and casing fluid 206, which may comprise one or more of oil, gas, fresh water, saline water, or other substances. The tool 202 comprises a probe 210 within which various subsystems of the tool 202 reside. These subsystems are equipped to measure various parameters associated with the formation and wellbore. In the illustrative case of FIG. 2 the probe 210 is suspended within the borehole 204 by a cable 212. Cable 212, in some embodiments a multi-conductor armored cable, not only provides support for the probe 210, but also in these embodiments communicatively couples the tool 202 to a surface telemetry module 214 and a surface computer 216. The tool 202 may be raised and lowered within the borehole 204 by way of the cable 212, and the depth of the tool 202 within the borehole 204 may be determined by depth measurement system 218 (illustrated as a depth wheel). The casing string 220 may be composed of multiple segments of casing that are joined using casing collars, such as collar 222. In some embodiments, tools (e.g., electrodes, logging equipment, and communication equipment including fiber optics and transmitters and/or receivers) may be included within, coupled to or adjacent to the casing string 220 and/or the collar 222, or along a tubing (not expressly shown in FIG. 2). For example, FIG. 2 includes a transceiver 224 that functions as a transmitter, receiver or both and communicates with other transmitters, receivers or transceivers in other parts of the borehole 204, within the probe 210, at the surface or in another well.

FIG. 3 is a schematic diagram of a producing well with a borehole 302 that has been drilled into the earth. Such boreholes, examples of which are described above with respect to FIGS. 1 and 2, are routinely drilled to ten thousand feet or more in depth and can be steered horizontally for twice that distance. The producing well includes a casing header 304 and casing 306, both secured into place by cement 303. Blowout preventer (BOP) 308 couples to casing header 306 and production wellhead 310, which together seal in the well head and enable fluids to be extracted from the well in a safe and controlled manner.

The use of measurement devices permanently installed in the well facilitates monitoring of the well and/or the surrounding formation. The different transducers send signals to the surface that may be stored, evaluated and used to monitor the well's operations. Such signals may be transmitted using, e.g., a transceiver 334 that couples to or is disposed within the casing 306, a collar of the casing 306 or production tubing 312. Such a transmitter may communicate with a receiver in any part of the system shown in FIG. 3, such as a receiver disposed in another part of the casing 306, within a different casing collar, within the well, or at the surface. Near-wellbore measurements are periodically taken at the producing well and combined with measurements from other wells within a reservoir, enabling the overall state of the reservoir to be monitored, simulated and assessed. These measurements may be taken using a number of different downhole and surface instruments, including, but not limited to, temperature and pressure sensor 318 and flow meter 320. Additional devices also coupled in-line along production tubing 312 include downhole choke 316 (used to vary the fluid flow restriction), electric submersible pump (ESP) 322 (which draws in fluid flowing from perforations 325 outside ESP 322 and production tubing 312), ESP motor 324 (driving ESP 322), and packer 314 (isolating the production zone below the packer from the rest of the well). Additional surface measurement devices may be used to measure, for example, the tubing head pressure and the electrical power consumption of ESP motor 324. Although the example of FIG. 3 shows a well that incorporates an ESP, the disclosed systems and methods may also be used with wells that incorporate other systems for assisting with the extraction of fluids (e.g., gas lift systems), or with wells without such assist systems that rely on the pressure already present in the formation and/or induced by the injector wells.

At least some of the devices along production tubing 312 couple to cable 328, which is attached to the exterior of production tubing 312 and is run to the surface through blowout preventer 308 where it couples to control panel 332. Cable 328 provides power to the devices to which it couples, and further provides signal paths (electrical, optical, etc.,) that enable control signals to be directed from the surface to the downhole devices, and for telemetry signals to be received at the surface from the downhole devices. The devices may be controlled and monitored locally by field personnel using a user interface built into control panel 332, or they may be controlled and monitored by a computer system (not specifically shown). Communication between control panel 332 and such a computer system may be via a wireless network (e.g., a cellular network), via a cabled network (e.g., a cabled connection to the Internet), or a combination of wireless and cabled networks.

Figure 4:
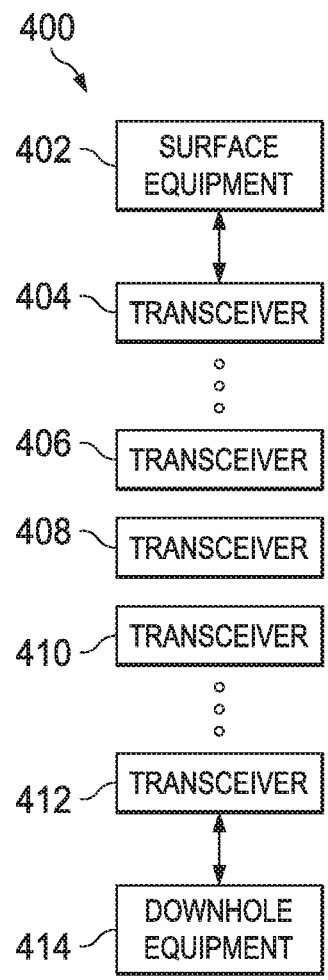
FIG. 4 is a schematic diagram of an illustrative series of transceivers in which the disclosed techniques may be applied.

FIG. 4 is a schematic diagram of an illustrative telemetry system 400 in which the disclosed techniques may be applied. The system 400 includes surface equipment 402, downhole equipment 414, and a series of transceivers 404, 406, 408, 410, 412 positioned between the equipment 402, 414. As alluded above, the system 400 finds primary application in downhole environments, with the surface equipment 402 positioned at the surface, the downhole equipment 414 positioned in or on a drill string bottom hole assembly, wireline probe, tubing, casing, cement sheath, or other suitable downhole apparatus, and the series of transceivers positioned at variable intervals along a drill string, tubing, casing, cement sheath, formation, or any other suitable location. For example, in the system 100 of FIG. 1, the surface equipment 402 may include the surface interface 126 and the computer 128; the downhole equipment 414 may be positioned in the bottom hole assembly 116; and the series of transceivers may be positioned in the bottom hole assembly 116, various subs along the length of the drill string 108, coupled to the casing 113, or any combination thereof. Other positions for the transceivers are contemplated-for example, in a well adjacent to the well 112. In another example, the surface equipment 402 may comprise the surface computer 216 and the surface telemetry module 214. The downhole equipment 414 may be located within the wireline probe 210, and the series of transceivers may be positioned, for instance, along the casing 220 or in a cement sheath (not specifically shown) abutting the casing 220. As with the system 100, alternative positions for the transceivers are contemplated and included within the scope of disclosure. In yet another example, the surface equipment 402 may be formed at least in part by the control panel 332 of FIG. 3 and any computer(s) with which the control panel 332 communicates. The downhole equipment 414 and the series of transceivers may couple to the casing 306 (or collars of the casing 306), the production tubing 312, the cement sheath 303, other downhole equipment specifically shown or not shown in FIG. 3, or some combination thereof. Consecutive transceivers in the series of transceivers may be separated by, for instance, 500 to 1000 feet, although any suitable inter-transceiver distance may be used between any two transceivers. These arrangements are merely illustrative; the system 400 will find application in virtually any environment in which data is to be wirelessly communicated using a series of transceivers.

The surface equipment 402 generally includes any suitable type of data processing equipment—such as a surface computer—and, optionally, a transmitter and receiver for providing data to and receiving data from the series of transceivers. Alternatively, the surface equipment 402 may couple directly to the transceiver 404 to enable communications with the downhole equipment 414. Other types of equipment may be included as part of the surface equipment 402. The downhole equipment 414 generally includes measurement and logging devices—for example, instruments to measure various types of formation properties or parameters (e.g., flow and pressure). The downhole equipment 414 also includes a transmitter and receiver to facilitate communications with the surface equipment 402, or, alternatively, the downhole equipment 414 may couple directly with the transceiver 412 to facilitate such communications. Although this disclosure describes the system 400 as implementing acoustic telemetry, the system 400 may implement any suitable type of telemetry technique. Additionally, the system 400 may include virtually any number of transceivers, as the ellipses depicted in FIG. 4 indicate.

Figure 5:
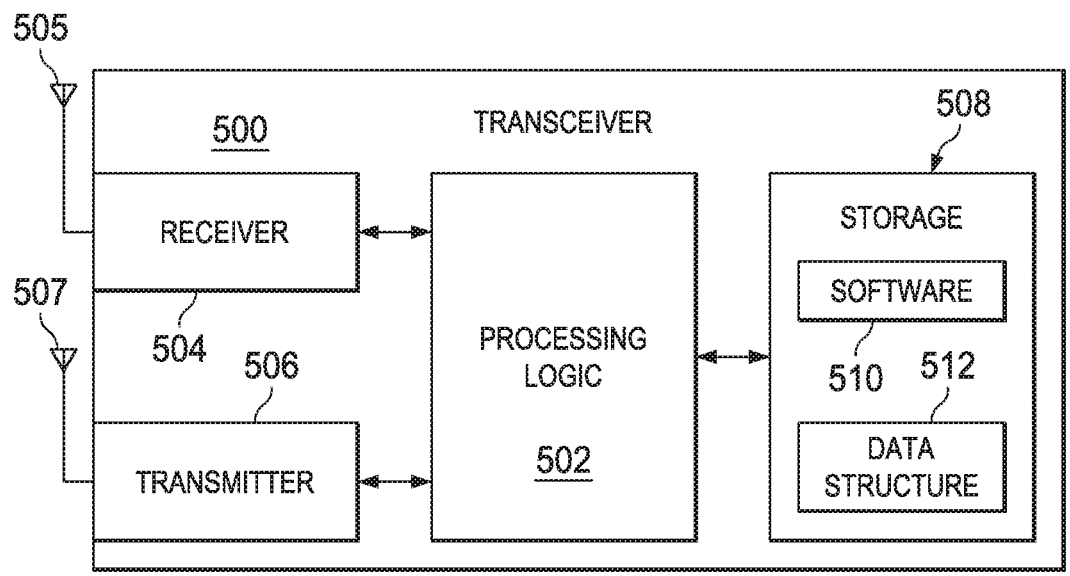
FIG. 5 is a block diagram depicting some of the components of an illustrative transceiver.

FIG. 5 is a block diagram depicting some components of an illustrative transceiver 500. The transceiver 500 is representative of each of the transceivers 404, 406, 408, 410, 412, although these transceivers may have alternative designs and are not limited to the embodiments depicted in FIG. 5. The illustrative transceiver 500 includes processing logic 502, a receiver 504 coupled to the logic 502 and to an antenna 505, a transmitter 506 coupled to the logic 502 and to an antenna 507, storage 508 coupled to the logic 502 and comprising software 510 (e.g., software that enables the logic 502 to perform the functions of a transceiver, including to transmit, receive, encode, decode and process data) and data structure(s) 512 (e.g., to store addresses of one or more of the transceivers 404, 406, 408, 410, 412 to facilitate communications between the transceivers). Other components—for example, one or more power supplies—may also be included within the illustrative transceiver 500. The transceiver skipping techniques are now described with respect to FIGS. 4-7.

The transceiver skipping techniques disclosed herein are generally directed to skipping one or more transceivers when conditions in the area of the wellbore in which the transceivers are situated facilitate high-quality communications. High communication quality data signals travel farther while maintaining an appropriate level of signal strength and have high correlation values. Under such conditions, it is not necessary for every transceiver in a series of transceivers to receive, decode, process, encode and re-transmit the data. Because one or more transceivers may be skipped, data is communicated between surface equipment and downhole equipment at a substantially faster rate than would otherwise be the case.

Communication quality—and, hence, whether one or more transceivers should be skipped—is determined according to one or more predetermined metrics. In at least some embodiments, these metrics include signal strength and/or correlation value, although other suitable metrics also may be used. Each transceiver evaluates the communication quality of the area in which that transceiver is located based on one or more of these metrics. The transceiver measures these metrics and compares them to one or more criteria to determine whether the communication quality in the vicinity of that transceiver is adequate for transceiver skipping. For example, the transceiver 406 in FIG. 4 may repeatedly receive data packets with strong signals but with contents that are difficult to resolve with certainty. Such packets may, for instance, contain bit strings that the transceiver 406 determines to have a 60% probability of being a certain value, but a 40% probability of being a different value. Such packets with poor correlation values may indicate poor communication quality in the vicinity of that transceiver. Conversely, such packets may contain bit strings that the transceiver 406 determines to have a 90% probability of being one value and only a 10% probability of being a different value. The transceiver may categorize such a correlation value as indicative of a high communication quality. The transceiver thus is able to determine such correlation values and compare them to a correlation value criterion. If a certain percentage of incoming packets have correlation values meeting the criterion, the transceiver may deem the area as having high communication quality, but if that requirement is unmet, the area may be deemed to have a low communication quality. The transceiver may also consider a variety of other factors, such as signal strength, in establishing its criterion to determine whether a particular area is of high or low communication quality. In cases where the transceiver establishes multiple criteria (each corresponding to a quality factor, such as signal strength or correlation value) to determine whether the area in which it is located has a high communication quality, the transceiver may require that all such criteria be met, that a subset of such criteria be met, or that only one of the criteria be met. All such variations are included within the scope of this disclosure. These criteria may be stored, for example, in one or more data structures 512 (FIG. 5).

Transceivers use received data packets not only to assess communication quality, but also to assess the spatial extent of that communication quality. Although various techniques for such spatial assessment are contemplated, in at least some embodiments each transceiver that processes a packet identifies the transceiver from which that packet was sent. The transceiver is programmed to include data structures 512 that cross-reference transceiver addresses with transceiver positions along the wellbore. Thus, for example, the transceiver may receive a set of packets that suggest a high communication quality, and the transceiver may determine—based on the address of the transceiver from which the packets were received—the location of the sending transceiver. If the location of the sending transceiver is far away, the high communication quality is likely present over a large area. If the location of the sending transceiver is close, the high communication quality may or may not be present over a large area, but it is likely present at least over a small area (i.e., the area between the sending and receiving transceivers). A similar analysis may be performed for poor communication quality to determine the spatial extent of the poor communication quality. Such analyses may be performed constantly or periodically, since transmission conditions may fluctuate often.

The number of transceivers that are skipped during a data transmission depends at least in part on the communication quality and the spatial extent of that communication quality. If a transceiver determines that a good communication quality exists over a large area, it may attempt to transmit the data to a transceiver that is relatively far away (e.g., it may skip over two, five, or even ten or more transceivers, or any other number of transceivers). Conversely, if the transceiver determines that poor communication quality exists over a large area, it may attempt to transmit the data to a transceiver that is relatively close by (e.g., it may skip over one transceiver or no transceivers). Thus, for example, referring to FIG. 4, the transceiver 406 may transmit data to transceiver 410 or 412 if transceiver 406 determines that there is good communication quality over a large area. Conversely, the transceiver 406 may transmit data to transceiver 408 if it determines that there is poor communication quality over a large area, or if there is good communication quality over a small area. All such possibilities are included within the scope of disclosure and may be programmed into the software 510 (FIG. 5) accordingly.

After a transceiver transmits data by skipping one or more transceivers, that transceiver may receive an acknowledgement signal from the intended recipient transceiver, indicating that the data was successfully received. For example, referring to FIG. 4, if transceiver 406 transmits data directly to transceiver 410 by skipping transceiver 408, transceiver 410 may send an acknowledgement signal to the transceiver 406 indicating successful receipt of the data. If such a signal is received by the transceiver 406, the transceiver 406 may continue sending packets directly to the transceiver 410, or, alternatively, the transceiver 406 may attempt to skip over the transceiver 410 and transmit subsequent data packets even farther than the transceiver 410. If the transceiver 406 fails to receive an acknowledgement signal within a predetermined amount of time, the transceiver 406 may subsequently transmit data to a transceiver that is closer than the one to which it previously transmitted data (e.g., to transceiver 408).

The transceivers use an addressing scheme that enables them to perform the transceiver skipping techniques described herein. Table 1 describes one such addressing scheme in the context of FIG. 4, although the scope of disclosure encompasses other suitable addressing schemes as well.

TABLE 1

| Transceiver - Position number | Main/Auxiliary Address | Backup Main/Auxiliary Address |
|---|---|---|
| 404 - 1 | 1.0/2.2 | 1.1/2.3 |
| . . . | . . . | . . . |
| 406 - 4 | 4.0/5.2 | 4.1/5.3 |
| 408 - 5 | 5.0/6.2 | 5.1/6.3 |
| 410 - 6 | 6.0/7.2 | 6.1/7.3 |
| . . . | . . . | . . . |
| 412 - 10 | 10.0/11.2 | 10.1/11.3 |

As Table 1 shows, the illustrative series of transceivers contains a total often transceivers, with transceiver 404 being farthest uphole; transceiver 406, 408, 410 being the fourth, fifth and sixth transceivers from the surface, respectively; and transceiver 412 being the transceiver farthest downhole. Because the transceiver 404 is in position 1, it has a main address 1.0 and, for reasons explained below, an auxiliary address of 2.2. Because the transceiver 406 is in position 4, it has a main address of 4.0 and, for reasons explained below, an auxiliary address of 5.2. Because the transceiver 408 is in position 5, it has a main address of 5.0 and, for reasons explained below, an auxiliary address of 6.2. Because the transceiver 410 is in position 6, it has a main address of 6.0 and, for reasons explained below, an auxiliary address of 7.2. Because the transceiver 412 is in position 10, it has a main address of 10.0 and, for reasons explained below, an auxiliary address of 11.2.

In some embodiments, each of the transceivers is paired with a backup transceiver that can perform the duties of the first transceiver in case of failure. Each of these backup transceivers has backup main and auxiliary addresses, as shown. Specifically, each of the backup main addresses has the same root as the corresponding main address (e.g., for transceiver 406, the main address is 1.0 and the backup transceiver has a backup main address of 1.1, with both having the same root 1.x). The same is true for the backup auxiliary addresses. The addresses, including their formats, are merely illustrative. Any suitable addressing scheme that implements the concepts described herein falls within the scope of the disclosure.

In operation, data may need to be transmitted from the surface equipment 402 to the downhole equipment 414 (FIG. 4). Accordingly, the transceiver 404 may transmit data using its main address 1.0. Although multiple transceivers may be able to hear the acoustic signal transmitted by the transceiver 404, only the transceiver positioned immediately after transceiver 404 will receive, decode, process, encode and re-transmit the data, since that transceiver is listening for data signals bearing a source address of the transceiver immediately before it (i.e., a source address of 1.x, where x is any number, in this case, 1.0). In this scenario, no transceivers are skipped.

The data eventually reaches the transceiver 406. The transceiver 406 may have determined, based on prior received data, that the communication quality in the area of the transceiver 406 meets predetermined quality criteria, such as those described above.

Accordingly, the transceiver 406 may skip the transceiver 408 and transmit its signal directly to the transceiver 410. The transceiver 410, which is in position 6, is programmed to receive, decode, process, encode, and re-transmit only those data packets bearing a source address that it interprets as corresponding to position 5—that is, a source address that has a root of 5 (i.e., 5.x, where x is any number). Accordingly, the transceiver 406 sends the data signal using the auxiliary address 5.2 as the source address. The transceiver 410 monitors its environment for any data packet bearing the source address of 5.x, because it has been programmed to receive and process only those packets received from the transceiver in position 5. In this case, because the data packet sent from the transceiver 406 bears the address 5.2, transceiver 410 receives and processes the data packet as if the data packet were received from the transceiver 408. Thus, the transceiver 410 is—in a sense—"tricked" into receiving and processing the data packet, even though the packet has actually been transmitted from receiver 406 and not receiver 408. As explained above, any suitable number of transceivers may be skipped to enhance communication speed, so long as the communication quality criteria are met. The receiver 410 may subsequently transmit an acknowledgement signal to the transceiver bearing source address 5.2—that is, to transceiver 406.

In the event that a particular transceiver fails, its backup transceiver is used instead. For example, if transceiver 406 fails, its backup transceiver may transmit the data packet directly to transceiver 408 using backup main address 4.1. The transceiver 408 will detect and process this data packet because the packet bears the same address root as the transceiver immediately before the transceiver 408—that is, an address of 4.x. If, however, the backup to transceiver 406 transmits the data packet using the backup auxiliary address 5.3, the data packet will skip transceiver 408 and be received and processed by the transceiver 410, since the data packet bears an address that the transceiver 410 interprets as belonging to the transceiver 408 (i.e., an address of 5.x). The number of addresses associated with each transceiver may be expanded as desired to facilitate the skipping of multiple transceivers.

The skipping technique described above may be used in reverse order when transmitting data from the downhole equipment 414 to the surface equipment 402. The difference between transmitting downhole and transmitting uphole is that, in the downhole direction, packet source addresses are manipulated to skip transceivers, while in the uphole direction, packet destination addresses are manipulated to skip transceivers. Thus, for example, when transceiver 410 receives a data packet to be transmitted uphole, it may encode the data packet with a destination address of 5.0 to transmit the packet to transceiver 408 or a destination address of 5.2 to skip over the transceiver 408 and to transmit directly to transmit 406. In some embodiments, the addressing scheme may be modified so that destination addresses are manipulated to skip transceivers while transmitting in the downhole direction and so that source addresses are manipulated to skip transceivers while transmitting in the uphole direction. Any and all such combinations and variations are contemplated and included within the scope of the disclosure.

Figure 6:
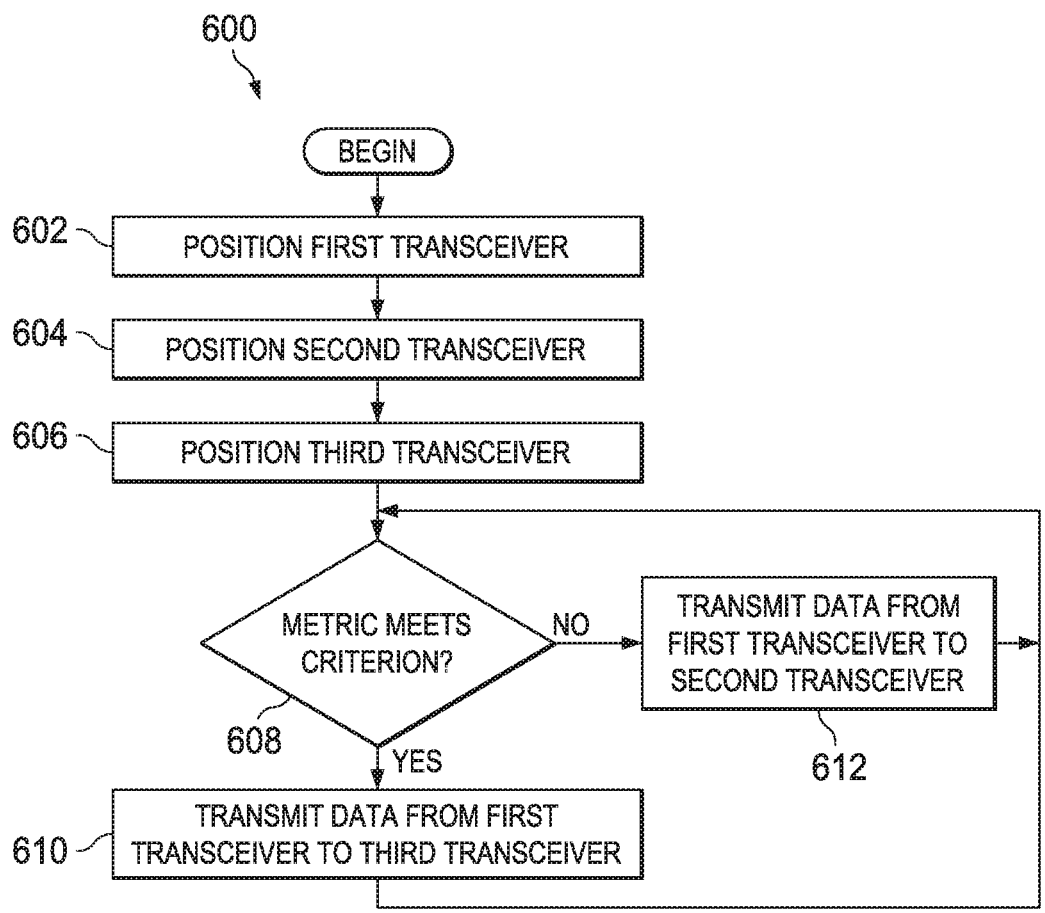
FIG. 6 is a flow diagram of a method used to selectively skip transceivers.

FIG. 6 is a flow diagram of a method 600 used to selectively skip transceivers in a set of three illustrative transceivers. The method 600 begins by positioning first, second and third transceivers (steps 602, 604, 606). As explained, the skipping technique finds primary application in downhole environments, and so the first, second and third transceivers may be positioned along a tubing, in a cement sheath, on a casing, or any other suitable location. Because the skipping technique may be applied in other contexts also, the transceivers may be arranged, for example, along the surface of the Earth. The method 600 then includes determining whether a communication quality metric meets a predetermined criterion (step 608). In some embodiments, multiple criteria may be used to evaluate different aspects of communication quality. If a requisite number of criteria have been met, the method 600 comprises transmitting data from the first transceiver to the third transceiver using the addressing scheme described above with respect to Table 1 (step 610). In this way, the second transceiver is skipped. Otherwise, the method 600 comprises transmitting data from the first transceiver to the second transceiver (step 612), since communication quality was inadequate for transceiver skipping.

Another transceiver skipping technique is now described with respect to FIG. 4 and Table 1. In this technique, a transceiver—such as transceiver 406—transmits data using source address 4.0. Thus, the target transceiver is the next consecutive transceiver—that is, transceiver 408. Although the data is not targeted for transceiver 410, the transceiver 410 also may receive the data. Because the data is targeted to transceiver 408 and not transceiver 410, the transceiver 410 decodes, but does not re-transmit, the data unless a predetermined amount of time has passed without having received that data from the transceiver 408. If the predetermined amount of time has passed without having received the data from the transceiver 408, the transceiver 408 may be non-functional. In cases where each transceiver is paired with a backup transceiver, failure to receive the data from transceiver 408 or its backup transceiver within the predetermined amount of time indicates that both the transceiver 408 and its backup transceiver are non-functional. Accordingly, the transceiver 410 proceeds with processing, encoding and re-transmitting the data that it received from transceiver 406. Any number of defective or otherwise non-operational transceivers may be skipped in this manner. In addition, the skipping technique described above and with respect to FIG. 6 may be preemptively used by a transmitting transceiver if that transceiver is "aware" that one or more of the following transceivers is non-operational. A transceiver may determine that one or more of the following transceivers is non-operational, for example, when it transmits one or more packets to the following transceivers but receives no acknowledgement signal in return.

Figure 7:
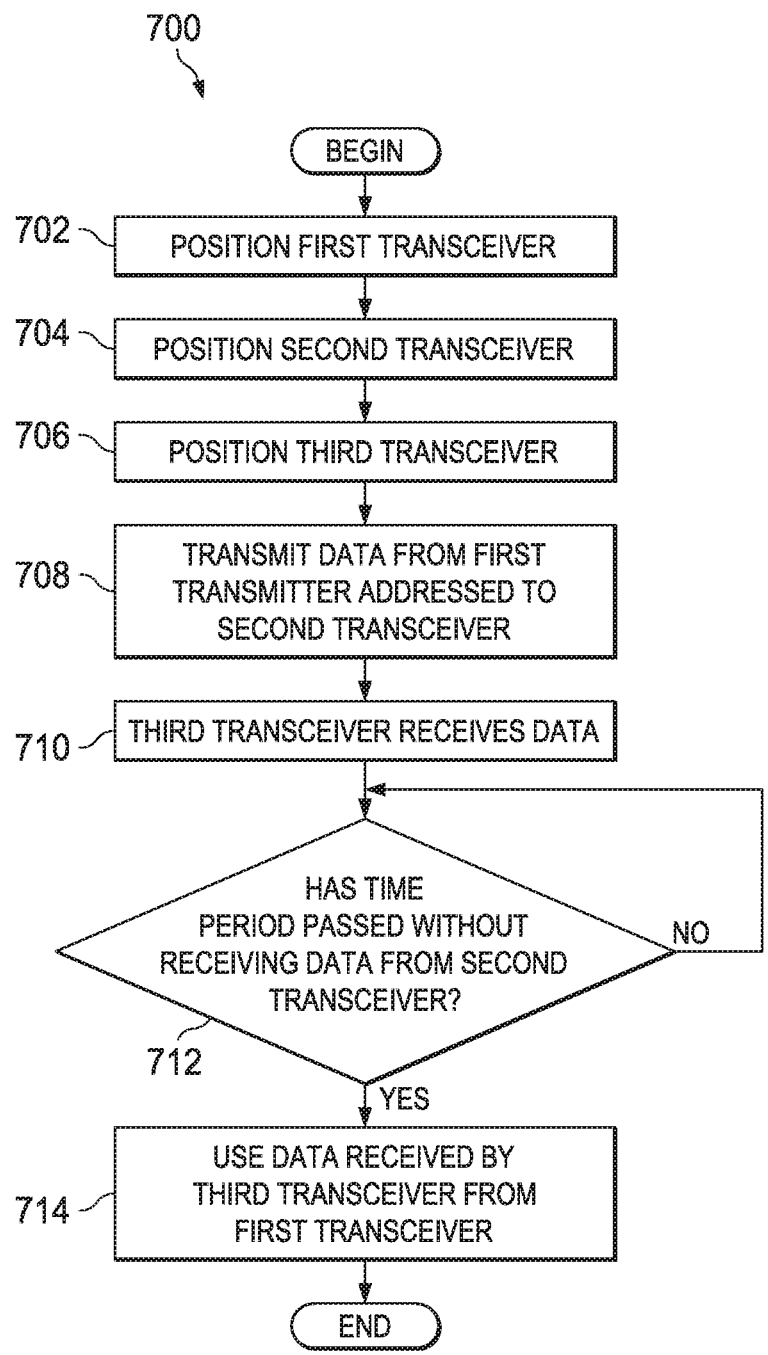
FIG. 7 is a flow diagram of another method used to selectively skip transceivers.

FIG. 7 is a flow diagram of a method 700 used to skip defective or otherwise non-operational transceivers in a set of three illustrative transceivers. The method 700 includes positioning first, second and third transceivers (steps 702, 704, 706). As explained above, because the embodiments described herein find primary application in a downhole environment, the transceivers may couple to a tubing, casing, cement sheath, or other suitable downhole apparatus. Applications in other environments, however, are contemplated and included in the scope of the disclosure. The method 700 next comprises transmitting data, targeted at the second transceiver, from the first transceiver (step 708). The third transceiver receives the data (step 710). The method 700 includes determining whether a predetermined time period has elapsed without the third transceiver receiving the data from the second transceiver (step 712). If not, control of the method 700 returns to step 712. Otherwise, the method 700 includes using the data received by the third transceiver from the first transceiver (step 714)—for example, by processing, encoding and re-transmitting the data. The methods 600 and 700 may be modified as desired, including by adding, deleting, modifying or rearranging individual steps.

The foregoing skipping techniques rely to at least some extent on the communication quality present in the general vicinity of the transceivers that are transmitting and receiving data. If a transceiver determines that the communication quality is inadequate to perform transceiver skipping, that transceiver may take certain measures to increase communication quality, and it may directly or indirectly send request signals to one or more other transceivers to do the same. One illustrative technique for improving communication quality is to reduce the data bit rate. For example, a transceiver may slow the rate at which it transmits data to the next consecutive transceiver in an effort to improve the communication quality metrics in that particular area. Conversely, if the communication quality in a particular area is determined to be good or excellent (i.e., meets a predetermined criterion), the bit rate may be increased to strike a balance between communication quality (which will decrease with an increased bit rate) and communication speed (which will increase with an increased bit rate). Similarly, communication quality can be improved by selecting a superior carrier frequency. The communication quality metrics described above may be used to evaluate a set of different carrier frequencies and to select the best frequency. An improved communication quality, in turn, facilitates transceiver skipping and thus improvements in communication speed. Further, in some embodiments, the transceivers may communicate in either half duplex mode or full duplex mode. In half duplex mode, the transceivers transmit data in a single direction (e.g., uphole or downhole), while in full duplex mode, the transceivers transmit data simultaneously in both directions (e.g., uphole and downhole). Full duplex mode is generally used when communication quality is high (i.e., meets a predetermined criterion), as substantial increases in data traffic that accompany full duplex mode may degrade communication quality and, by extension, the ability to skip transceivers.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

At least some embodiments are directed to a system for improving communication between surface and downhole equipment, comprising: a first transceiver in a formation; a second transceiver in the formation; and a third transceiver in the formation, the second transceiver positioned between the first and third transceivers, wherein, upon determining that a communication quality metric pertaining to wireless communication in the formation fails to meet a criterion, the first transceiver transmits data to the second transceiver, wherein, upon determining that said communication quality metric meets the criterion, the first transceiver transmits said data to the third transceiver in lieu of transmitting said data to the second transceiver. One or more of these embodiments may be modified using one or more of the following concepts, in any order and in any combination: wherein: the first transceiver has a first main address and a first auxiliary address, to transmit the data to the second transceiver, the first transceiver uses the first main address, and to transmit the data to the third transceiver, the first transceiver uses the first auxiliary address; wherein, upon receiving the data using the first auxiliary address, the third transceiver interprets the data as having been transmitted from the second transceiver, wherein: the second transceiver has a second main address and a second auxiliary address, the third transceiver has a third main address and a third auxiliary address, to transmit the data to the second transceiver, the first transceiver uses the second main address, to transmit the data to the third transceiver, the first transceiver uses the third auxiliary address; wherein, upon receiving said data using the third auxiliary address, the third transceiver interprets the data as having been transmitted from the second transceiver; further comprising a plurality of transceivers positioned between the second and third transceivers, and wherein, upon determining that said communication quality metric meets said criterion, the first transceiver transmits the data to the third transceiver in lieu of the data being transmitted to the second transceiver or to any of the plurality of additional transceivers; wherein the communication quality metric is selected from the group consisting of: correlation value, signal strength, or both; wherein the first transceiver is positioned uphole relative to the second and third transceivers; wherein the first transceiver is positioned downhole relative to the second and third transceivers.

At least some embodiments are directed to a packet recovery system, comprising: a first transceiver in a formation; a second transceiver in the formation; and a third transceiver in the formation, the second transceiver positioned between the first and third transceivers, wherein the first transceiver transmits data addressed to the second transceiver, wherein the third transceiver receives the data and, upon determining that the second transceiver has not forwarded said data to the third transceiver within a predetermined amount of time, re-transmits the data received from the first transceiver. One or more of these embodiments may be modified using one or more of the following concepts, in any order and in any combination: wherein, upon determining that a communication quality metric pertaining to wireless communication in the formation fails to meet a criterion, the first transceiver decreases its data transmission rate; wherein, upon determining that a communication quality metric pertaining to wireless communication in the formation fails to meet a criterion, the first transceiver adjusts a carrier frequency used to transmit data; wherein the system operates in full duplex mode.

At least some embodiments are directed to a method for improving communication between surface and downhole equipment, comprising: positioning a first transceiver in a formation; positioning a second transceiver in the formation; positioning a third transceiver in the formation, the second transceiver positioned between the first and third transceivers; transmitting data from the first transceiver to the second transceiver upon determining that a communication quality metric pertaining to wireless communication in the formation fails to meet a criterion; and transmitting said data from the first transceiver to the third transceiver in lieu of transmitting the data to the second transceiver upon determining that said communication quality metric meets the criterion. One or more of these embodiments may be modified using one or more of the following concepts, in any order and in any combination: wherein: the first transceiver has a first main address and a first auxiliary address, transmitting data to the second transceiver comprises using the first main address, and transmitting data to the third transceiver comprises using the first auxiliary address; further comprising the third transceiver interpreting the data as having been transmitted from the second transceiver upon receiving the data using the first auxiliary address; wherein: the second transceiver has a second main address and a second auxiliary address, the third transceiver has a third main address and a third auxiliary address, transmitting the data from the first transceiver to the second transceiver comprises using the second main address, and transmitting the data from the first transceiver to the third transceiver comprises using the third auxiliary address, the third transceiver interpreting the data as having been transmitted from the second transceiver, wherein the communication quality metric is selected from the group consisting of: correlation value, signal strength, or both; further comprising positioning the first transceiver uphole relative to the second and third transceivers; further comprising positioning the first transceiver downhole relative to the second and third transceivers.

The following is claimed:

1. A system for improving communication between surface and downhole equipment, comprising:
a first transceiver in a formation;
a second transceiver in the formation; and
a third transceiver in the formation, the second transceiver positioned between the first and third transceivers, wherein:
each transceiver evaluates a communication quality of an area of the formation in which the transceiver is located based on measuring a communication quality metric for the area of the formation in which the transceiver is located, wherein the communication quality metric is a combination of at least a signal strength of a signal received by the transceiver and a correlation value of data received by the transceiver;
when the first transceiver determines that its measured communication quality metric fails to meet a criterion, the first transceiver transmits data to the second transceiver, and
when the first transceiver determines that its measured communication quality metric meets the criterion, the first transceiver transmits the data to the third transceiver in lieu of transmitting the data to the second transceiver.

2. The system of claim 1, wherein:
the first transceiver has a first main address and a first auxiliary address,
to transmit the data to the second transceiver, the first transceiver uses the first main address, and
to transmit the data to the third transceiver, the first transceiver uses the first auxiliary address.

3. The system of claim 2, wherein, upon receiving the data using the first auxiliary address, the third transceiver interprets the data as having been transmitted from the second transceiver.

4. The system of claim 1, wherein:
the second transceiver has a second main address and a second auxiliary address,
the third transceiver has a third main address and a third auxiliary address,
to transmit the data to the second transceiver, the first transceiver uses the second main address, and
to transmit the data to the third transceiver, the first transceiver uses the third auxiliary address.

5. The system of claim 4, wherein, upon receiving the data using the third auxiliary address, the third transceiver interprets the data as having been transmitted from the second transceiver.

6. The system of claim 1, further comprising a plurality of transceivers positioned between the second and third transceivers, and wherein, when the first transceiver determines that its metric meets the criterion, the first transceiver transmits the data to the third transceiver in lieu of transmitting the data to the second transceiver or to any of the plurality of additional transceivers.

7. The system of claim 1, wherein the first transceiver is positioned uphole relative to the second and third transceivers.

8. The system of claim 1, wherein the first transceiver is positioned downhole relative to the second and third transceivers.

9. A packet recovery system, comprising:
a first transceiver in a formation;
a second transceiver in the formation; and
a third transceiver in the formation, the second transceiver positioned between the first and third transceivers, wherein:
the first transceiver transmits data packets targeted to the second transceiver,
the third transceiver receives the data packets targeted to the second transceiver and if the data packets targeted to the second transceiver have not been received by the third transceiver from the second transceiver within a predetermined amount of time the third transceiver transmits the data packets targeted to the second receiver and the first transceiver decreases its transmission rate.

10. The system of claim 9, wherein the system operates in full duplex mode.

11. A method for improving communication between surface and downhole equipment, comprising:
positioning a first transceiver in a formation;
positioning a second transceiver in the formation;
positioning a third transceiver in the formation, the second transceiver positioned between the first and third transceivers;
measuring, by each transceiver, a communication quality metric for an area of the formation in which the transceiver is located, wherein the communication quality metric is a combination of at least a signal strength of a signal received by the transceiver and a correlation value of data received by the transceiver;

evaluating, by each transceiver, a communication quality of the area of the formation in which the transceiver is located based on the communication quality metric;

transmitting data from the first transceiver to the second transceiver when the first transceiver determines that its communication quality metric fails to meet a criterion; and transmitting the data from the first transceiver to the third transceiver in lieu of transmitting the data to the second transceiver when the first receiver determines that its communication quality metric meets the criterion.

12. The method of claim 11, wherein:
the first transceiver has a first main address and a first auxiliary address,
transmitting data to the second transceiver comprises using the first main address, and
transmitting data to the third transceiver comprises using the first auxiliary address.

13. The method of claim 12, further comprising the third transceiver interpreting the data as having been transmitted from the second transceiver upon receiving the data using the first auxiliary address.

14. The method of claim 11, wherein:
the second transceiver has a second main address and a second auxiliary address,
the third transceiver has a third main address and a third auxiliary address,
transmitting the data from the first transceiver to the second transceiver comprises using the second main address, and
transmitting the data from the first transceiver to the third transceiver comprises using the third auxiliary address, the third transceiver interpreting the data as having been transmitted from the second transceiver.

15. The method of claim 11, further comprising positioning the first transceiver uphole relative to the second and third transceivers.

16. The method of claim 11, further comprising positioning the first transceiver downhole relative to the second and third transceivers.

17. A packet recovery system, comprising:
a first transceiver in a formation;
a second transceiver in the formation; and
a third transceiver in the formation, the second transceiver positioned between the first and third transceivers, wherein:
the first transceiver transmits data packets targeted to the second transceiver,
the third transceiver receives the data packets targeted to the second transceiver and if the data packets targeted to the second transceiver have not been received by the third transceiver from the second transceiver within a predetermined amount of time the third transceiver transmits the data packets targeted to the second receiver and the first transceiver adjusts a carrier frequency used to transmit data.

* * * * *